United States Patent
Ando et al.

(10) Patent No.: US 11,678,688 B2
(45) Date of Patent: Jun. 20, 2023

(54) FAT-PROCESSED STARCH AND PROCESS FOR PRODUCING SAME

(71) Applicant: NIHON SHOKUHIN KAKO CO., LTD., Shizuoka (JP)

(72) Inventors: Ryuichi Ando, Shizuoka (JP); Hitoshi Takaguchi, Shizuoka (JP); Akane Okuda, Shizuoka (JP); Masayasu Takada, Shizuoka (JP)

(73) Assignee: NIHON SHOKUHIN KAKO CO., LTD., Tokyo (JP)

( * ) Notice: Subject to any disclaimer, the term of this patent is extended or adjusted under 35 U.S.C. 154(b) by 281 days.

(21) Appl. No.: 14/763,643

(22) PCT Filed: Apr. 23, 2013

(86) PCT No.: PCT/JP2013/061836
§ 371 (c)(1),
(2) Date: Nov. 13, 2015

(87) PCT Pub. No.: WO2014/115347
PCT Pub. Date: Jul. 31, 2014

(65) Prior Publication Data
US 2016/0066604 A1 Mar. 10, 2016

(30) Foreign Application Priority Data
Jan. 28, 2013 (JP) .............................. JP2013-012978

(51) Int. Cl.
| | | |
|---|---|---|
| *A23P 20/10* | (2016.01) | |
| *A23L 13/00* | (2016.01) | |
| *A23D 7/005* | (2006.01) | |
| *A23L 29/219* | (2016.01) | |
| *A23D 7/01* | (2006.01) | |
| *A23L 29/212* | (2016.01) | |
| *A23L 17/00* | (2016.01) | |
| *A23L 29/10* | (2016.01) | |
| *A23L 5/10* | (2016.01) | |

(52) U.S. Cl.
CPC ............ *A23P 20/11* (2016.08); *A23D 7/0053* (2013.01); *A23D 7/011* (2013.01); *A23L 5/11* (2016.08); *A23L 13/03* (2016.08); *A23L 17/75* (2016.08); *A23L 29/10* (2016.08); *A23L 29/212* (2016.08); *A23L 29/219* (2016.08); *A23P 20/105* (2016.08); *A23V 2002/00* (2013.01)

(58) Field of Classification Search
None
See application file for complete search history.

(56) References Cited

U.S. PATENT DOCUMENTS
4,491,483 A    1/1985   Dudacek et al.

FOREIGN PATENT DOCUMENTS

| | | |
|---|---|---|
| JP | S56106570 A | 8/1981 |
| JP | S5876055 A | 5/1983 |
| JP | H11243891 A | 9/1999 |
| JP | 2000106832 A | 4/2000 |
| JP | 2002218920 A | 8/2002 |
| JP | 2002291431 A | 10/2002 |
| JP | 2003235475 A | 8/2003 |
| JP | 2004113236 A | 4/2004 |
| JP | 2004283134 A | 10/2004 |
| JP | 2005073506 A | 3/2005 |
| JP | 2005185122 A | 7/2005 |
| JP | 2005204502 A | 8/2005 |
| JP | 2005348699 A | 12/2005 |
| JP | 2012029602 A | 2/2012 |
| JP | 2012157342 A | 8/2012 |
| JP | 2012165724 A | 9/2012 |

OTHER PUBLICATIONS

Miller, Emulsifiers: Types and Uses, in Encyclopedia of Food and Health, vol. 2: Che-Foo, Copyright 2016 Elsevier Ltd., pp. 498-502.
Krog, The Role of Low-Polar Emulsifiers in Protein-Stabilized Food Emulsions, In Emulsions—A Fundamental and Practical Approach, Copyright 1992 Springer Netherlands, pp. 61-74.
European Patent Office, Supplementary European Search Report, Application No. EP 13873031, dated Jul. 26, 2016.
Toda, et al., Shokuhin-yo Nyukazai-Kiso to Oyo-, Korin Publishing Co., Ltd., 1997 Nen, pp. 26-28 [English Language Translation Only].
Japan Patent Office, Patent Memorandum, Application No. 2013-012978, dated Mar. 29, 2013 [English Language Translation Only].
European Patent Office, Examination Report, Application No. EP 13873031.2, dated Apr. 19, 2017.

*Primary Examiner* — Elizabeth Gwartney
(74) *Attorney, Agent, or Firm* — Quarles & Brady LLP

(57) ABSTRACT

The present invention addresses the problem of developing a fat-processed starch which is excellent in terms of all of three properties, i.e., "workability during the preparation of a coating material for fries," "function required of coating materials for fries (adhesion to ingredients)" and "moderate slurry viscosity." The fat-processed starch of the present invention is produced by a process comprising the steps: adding a fat with which an emulsifying agent has been mixed to a starch having a water content adjusted to 25 to 45 mass %, in an amount of 0.02 to 0.4 mass % in terms of the weight of the fat excluding the emulsifying agent relative to the weight of dry matter of the starch, and mixing the fat and the starch; adjusting the water content of the mixture is 0.2 to 0.5 time that of the starch before the addition of the fat; and aging the starch having the adjusted water content.

6 Claims, No Drawings

FAT-PROCESSED STARCH AND PROCESS FOR PRODUCING SAME

CROSS-REFERENCE TO RELATED APPLICATIONS

This application represents the national stage entry of PCT International Application No. PCT/JP2013/061836 Apr. 23, 2013, which claims priority of Japanese Patent Application No. 2013-012978 filed Jan. 28, 2013, the disclosures of which are incorporated herein by reference in their entirety and for all purposes.

TECHNICAL FIELD

The present invention relates to a fat-processed starch and a process for producing the same. The present invention also relates to a coating material for fries, comprising such a fat-processed starch, and a fried food comprising the coating material and an ingredient.

BACKGROUND ART

Fat-processed starches obtained by adding a fat to a starch to mix them and aging the mixture have been widely used in the form of batter or dusting flour as coating materials for fries, because the fat is attached and bound to the starch grains and the fat-processed starches provide preferable texture and adhesion when used as coating materials for fries (Patent Documents 1 to 7). However, such fat-processed starches involved the problems: that the mere mixing of a fat with a starch resulted in insufficient dispersion of the fat, so that the fat could not be uniformly attached to the starch, and, therefore, that sufficient functions could not be imparted to the fat-processed starches; and that their fluidity became significantly low due to the solidification of the powder. Further, in the case where the fat-processed starches were used as coating materials for fries, they involved the problems that they easily cause lumping and uneven dispersion during the preparation of batter and also cause non-uniform attachment when used as dusting flour.

In order to address the above problems, there have been used processes of emulsifying a fat to be added in the production of a fat-processed starch by incorporating an emulsifying agent in the fat (Patent Documents 8 to 10). However, the incorporation of the emulsifying agent has solved the problem concerning the properties of the powder, but has given rise to the new problem that, in the preparation of batter comprising a fat-processed starch, the slurry viscosity becomes too low in some cases, resulting in an impaired adhering function of the fat-processed starch and, therefore, an impaired function as a coating material for fries.

In order to address this new problem, a method of increasing the degree of heat-aging treatment to increase the slurry viscosity has been proposed (Patent Document 11). However, there has given rise to the problem that the increase in degree of heat-aging treatment also causes a rise in thermal damage that the starch would undergo, resulting in an impaired adhering function of the fat-processed starch.

REFERENCE LIST

Patent Document

[Patent Document 1] JP H11-243891 A
[Patent Document 2] JP 2000-106832 A
[Patent Document 3] JP 2002-218920 A
[Patent Document 4] JP 2002-291431 A
[Patent Document 5] JP 2003-235475 A
[Patent Document 6] JP 2004-113236 A
[Patent Document 7] JP 2012-29602 A
[Patent Document 8] JP 2005-185122 A
[Patent Document 9] JP 2005-204502 A
[Patent Document 10] JP 2012-165724 A
[Patent Document 11] JP 2005-73506 A

SUMMARY OF THE INVENTION

Problem to be Solved

While various technical developments concerning fat-processed starches for use in fried foods (fry foods) have conventionally been conducted as described above, it is considered to be desired to improve the dispersibility of a fat in a starch and also to develop a fat-processed starch having all of three properties, i.e., "workability during the preparation of a coating material for fries," "function required of coating materials for fries (adhesion to ingredients)" and "moderate slurry viscosity."

Therefore, it is an object of the present invention to provide a process for producing a fat-processed starch which not only provides good dispersibility of a fat in a starch, but also has good workability during the preparation of a coating material for fries, high slurry viscosity and high function required of coating materials for fries. It is a further object of the present invention to provide a coating material for fries, having high adhesion, and a fried food comprising the coating material.

Solution to the Problem

As a result of earnest studies to solve the above problems, the present inventors have found that a very highly functional fat-processed starch can be produced by adding a fat emulsified by an emulsifying agent to a starch having a water content adjusted within a certain range to mix the fat and the starch, thereafter reducing the water content of the starch greatly, and then further aging the starch, and eventually has completed the present invention.

The present invention is not limited to this, and encompasses the following embodiments.

(1) A process for producing a fat-processed starch, which comprises:
adding a fat with which an emulsifying agent has been mixed to a starch having a water content adjusted to 25 to 45 mass %, in an amount of 0.02 to 0.4 mass % in terms of the weight of the fat excluding the emulsifying agent relative to the weight of dry matter of the starch, and mixing the fat and the starch;
adjusting the water content of the mixture to 0.2 to 0.5 time that of the starch before the addition of the fat; and
aging the starch having the adjusted water content.

(2) The process according to item (1), wherein the emulsifying agent has an HLB of 2 to 10.

(3) The process according to item (1) or (2), wherein the amount of the emulsifying agent to be added to the fat is 0.5 to 5 time(s) the mass of the fat.

(4) A fat-processed starch produced by the process according to any one of items (1) to (3).

(5) A coating material for fries, comprising the fat-processed starch according to item (4).

(6) A fried food comprising the fat-processed starch according to claim 4 or the coating material for fries according to item (5).

Advantages of the Invention

The present invention can improve the dispersibility of a fat in a starch, and thus can provide a fat-processed starch having good workability during the preparation of a coating material for fries, high adhesion when used as a coating material for fries, and further high slurry viscosity. The fat-processed starch can also be used to provide a coating material for fries, having high adhesion to ingredients, and a fried food comprising the coating material for fries.

MODE FOR CARRYING OUT THE INVENTION

The fat-processed starch of the present invention can be produced by adding a fat emulsified by an emulsifying agent to a starch having a water content adjusted to 25 to 45 mass %, in an amount of 0.02 to 0.4 mass % in terms of the weight of the fat excluding the emulsifying agent relative to the weight of dry matter of the starch to mix the fat and the starch, then adjusting the water content of the mixture to 0.2 to 0.5 time that of the starch before the addition of the fat, and further conducting the aging treatment.

In short, the process for producing a fat-processed starch according to the present invention essentially comprises the steps of:

(1) adding a fat with which an emulsifying agent has been mixed to a starch having a water content adjusted to 25 to 45 mass %, in a predetermined amount, and mixing the fat and the starch;

(2) adjusting the water content of the starch with which the fat has been mixed to 0.2 to 0.5 time that stated in step (1); and (3) conducting the aging treatment.

Addition of Fat to Starch

While a starch having a water content adjusted to 25 to 45 mass % is used in the present invention, the method for adjusting the water content of the starch is not particularly limited to. The water content may be adjusted to the desired value either by appropriately adding water to a dry starch or by dehydration of a starch slurry. The water content of the starch can be increased, for example, by adding water as it is to the starch or by spraying moisture to the starch. Also, the water content of the starch can be adjusted to 25 to 45 mass %, for example, by putting the starch under humidity-controlled conditions.

In the present invention, the water content of the starch before the addition of the fat needs to be adjusted to 25 to 45 mass %, and preferably ranges from 30 to 40 mass %. A water content of the starch of less than 25 mass % causes a reduction in dispersibility of the fat and a great reduction in all of the workability, slurry viscosity and adhesion, and thus is not preferred. A water content of the starch of more than 45 mass % easily causes a dilatancy phenomenon, leading to a reduction in dispersibility of the fat, a great reduction in all of the workability, slurry viscosity and adhesion, and a possibility of causing clogging in the production steps, and thus is not preferred.

The starch used in the present invention is not particularly limited to so long as it can be used for foods, and includes, for example, corn starch (maize starch), tapioca starch (cassava starch), rice starch, wheat starch, potato starch, sweet potato starch, mung bean starch, dogtooth violet starch, arrowroot starch, bracken starch, sago starch, mung bean starch and Ooubayuri (*Cardiocrinum cardatum* var. *glehnii*) starch. Among these starches, tapioca starch, corn starch, rice starch and potato starch are readily available in large quantities at a low cost, and thus are preferred. For all the starches, not only normal starches, but also those improved by thremmatological or gene-engineering techniques, such as nonglutinous species, waxy species and high amylose species, may be used.

Further, various processed-starches can also be used in the present invention. There may be used starches obtained by subjecting raw material starches to chemical modification treatment such as oxidation treatment, esterification treatment, etherification treatment and crosslinking treatment; processing treatment such as pregelatinization treatment, granulation treatment, moist-heat treatment, ball milling treatment, pulverization treatment, heating treatment, warm water treatment, bleaching treatment, sterilization treatment, acid treatment, alkali treatment and enzyme treatment or two or more treatments thereof. In consideration of the function of the fat-processed starch according to the present invention as a coating material for fries, the starch used is preferably a crosslinked starch, and a phosphoric acid crosslinked starch is particularly preferred.

While a fat is added to the starch having the adjusted water content in the present invention, a fat with which the emulsifying agent has been mixed is used. The emulsifying agent needs to be added to the fat to emulsify the fat, and the amount of the emulsifying agent to be added to the fat is not particularly limited to, but is preferably 0.5 to 5 time(s) the mass of the fat. An amount of the emulsifying agent to be added of 0.5 time or more gives an improved dispersibility of the fat in the starch and greatly improved slurry viscosity and adhesion, and also good compatibility with water when the fat-processed starch is used as a coating material for fries. Therefore, the fat-processed starch is hard to lump up during the preparation of batter, and does not deteriorate in workability. Also, when the amount of the emulsifying agent to be added is 5 times or less, the function of the fat is not inhibited by the emulsifying agent, so that the slurry viscosity and adhesion would not be significantly reduced.

A method for adding the fat to the starch and mixing them is not particularly limited to so long as the fat can be dispersed in the starch, and such addition can be carried out by an ordinary method such as normal stirring and mixing, air stream mixing or spraying.

The amount of the fat to be added needs to be adjusted to 0.02 to 0.40 mass % relative to the weight of dry matter of the starch, and is preferably 0.04 to 0.25 mass %, and more preferably 0.08 to 0.20 mass %. An amount of the fat to be added of less than 0.02 mass % is not preferred because the fat does not exhibit a satisfactory function so that the slurry viscosity and adhesion are greatly reduced. An amount of the fat to be added of more than 0.4 mass % is not preferred because the slurry viscosity becomes excessively high so that the fat-processed starch easily lumps up during the preparation of batter, leading to significantly impaired workability.

The fat used in the present invention is not particularly limited to so long as it is edible, and includes, for example, linseed oil, perilla oil, Shiso (Japanese basil) oil, walnut oil, safflower oil, grape oil, soybean oil, sunflower oil, corn oil, cotton-seed oil, sesame oil, rapeseed oil, peanut oil, olive oil, palm oil, coconut oil, beef tallow, lard, chicken fat, mutton tallow, whale oil, fish oil, or fractionated oils thereof, or processed fats such as transesterified oils. Linseed oil, perilla oil, Shiso (Japanese basil) oil, safflower oil, and soybean oil are preferred.

The emulsifying agent used in the present invention is not particularly limited to so long as it is intended for foods and can emulsify fats, and includes, for example, glycerol fatty acid esters, polyglycerol fatty acid esters, glycerol organic acid fatty acid esters, polyglycerol condensed ricinoleic acid esters, sorbitan fatty acid esters, propylene glycol fatty acid esters, sucrose fatty acid esters and lecithins. In an aspect, glycerol fatty acid ester-based emulsifying agents such as glycerol fatty acid esters and polyglycerol fatty acid esters can preferably be used. Further, the emulsifying agent preferably has an HLB of 2 to 10 for dispersion of a fat in a water-containing starch via the emulsifying agent. This is because, when the HLB ranges from 2 to 10, the dispersion of the fat in the starch is facilitated, resulting in excellent workability, slurry viscosity and adhesion.

Adjustment of Water Content of Starch to which Fat has been Added

In the present invention, after addition of a fat with which the emulsifying agent has been mixed to a starch, the water content of the starch with which the fat has been mixed is adjusted to 0.2 to 0.5 time that of the starch before the addition of the fat. Namely, in the present invention, it is necessary to add a predetermined amount of the fat with which the emulsifying agent has been mixed to the starch having a relatively high water content and then to decrease the water content of the starch with which the fat has been mixed to ½ to ⅕ of the initial water content. The water content of the starch is greatly decreased in this way, thereby making it possible to improve the dispersibility and water compatibility of the fat-processed starch and to greatly improve the adhesion of the starch through the subsequent aging step. However, when the water content is adjusted to less than 0.2 time, the starch is charged, thereby easily causing it to be scattered in the air and worsening the water compatibility when the fat-processed starch is used as a coating material for fries. Therefore, the fat-processed starch is apt to go lumpy during the preparation of batter, resulting in significantly deteriorated workability. Hence, such a water content is not preferred. When the water content is adjusted to more than 0.5 time, the hydrolysis (thermal damage) of the starch is accelerated in the aging step, resulting in significantly deteriorated adhesion. Therefore, such a water content is not preferred. In this water content adjusting step, the water content of the starch with which the fat has been mixed is adjusted preferably to 0.22 to 0.47 time, more preferably 0.3 to 0.4 time, that of the starch before the addition of the fat.

The method for adjusting the water content is not particularly limited to, and the water content can be adjusted by using a drying machine such as a flash dryer, a spray dryer, a drum dryer, a paddle dryer or a rack-type dryer, but a flash drier is preferably used due to its capability to treat the starch in a large amount for a short time.

Aging of Starch Having Adjusted Water Content

In the present invention, the starch having the water content adjusted in the above-described manner is aged. The aging treatment in the present invention involves storing the starch mixture having the adjusted water content at 30 to 150° C. for a certain period of time. The aging treatment can be carried out by treating the starch mixture at a temperature of 30 to 150° C. in a state where it is put in a reactor, an extruder, a dryer, a tank, a container, a packaging material, etc. The starch mixture is preferably treated at a temperature of 30 to 70° C. in consideration of the thermal damage to the fat-processed starch. The aging treatment may be carried out by a method comprising heating treatment with a normal heating machine, but may, of course, be carried out by a method comprising storing the starch mixture in a state where it is put in a receptacle such as a tank, a container or a packaging material, as it is, in an environment at a temperature exceeding 30° C. even without heating. The aging time can be adjusted to a shorter time as the aging temperature is higher, but is appropriately 1 hour to 8 weeks, preferably 1 day to 6 weeks, more preferably 5 days to 4 weeks, particularly preferably 1 week to 3 weeks.

Fat-Processed Starch

The fat-processed starch of the present invention is used as dusting flour or sprinkling flour as it is, or is dissolved in water to be used as batter, and thus can be used as a coating material for fries. Further, the fat-processed starch according to the present invention can be used while being added to commercially available mix flour and the like. As the coating material for fries in the present invention, the fat-processed starch of the present invention may be used as it is, or may be used while being mixed with materials to be used in normal coating materials for fries according to need. Examples of the materials to be used in normal coating materials for fries include grain flour, finer rice powder, polysaccharide thickeners, expanding agents, proteins, starch decomposition products and reduced products, pigments, seasoning, perfumes, vitamin E and table salt, and such materials can be appropriately used according to need.

The fried food (fry food) of the present invention is a cooked food produced by using the above-described coating material for fries. So-called plain fries have no coating material, and thus do not correspond to the fries of the present invention. Examples of the fries of the present invention may include deep-fried chicken, tempura, tatsuta-age (fried food prepared by frying preliminarily seasoned ingredients), pork cutlet, beef cutlet, minced meat cutlet, cream croquette, fried prawn, fried calamari and fritter. The ingredients of the fried foods used herein are not particularly limited to, and there are usable: vegetables, fishes, meats, eggs, etc., which are generally used in fried foods.

The fried food of the present invention may be either a coated and frozen food intended to be deep-fried when desired, or a so-called frozen deep-fried food intended to be reheated in a microwave oven or the like. Namely, when the fried food according to the present invention is a frozen food, it may be either a prefried food or an un-prefried food. The prefried food just has to be heated before being eaten, and the un-prefried food just has to be deep-fried before being eaten. Also, the fried food of the present invention may be a so-called nonfried food utilizing a cooking method with a frying pan, a microwave oven, an oven, an oven range, a convection oven, etc.

In addition, the term "fried food" used herein not only encompasses foods after having been cooked (e.g., deep-fried), but also encompasses foods before being cooked (e.g., deep-fried), i.e., precooked foods comprising a coating material and an ingredient.

EXAMPLES

The present invention will be described in detail by way of the following examples, the technical scope of the invention is not limited to the following examples. In addition, the units "%," "part(s)" and the like are on the mass basis unless otherwise specified, and the numerical ranges thereof are indicated as including their endpoints.

Preparation of Various Fat-Processed Starches

Samples 1 to 20 indicated in the following Table 1 were prepared as fat-processed starches. Particular experimental procedures were as indicated below.

TABLE 1

| Name of Sample | Step (1): water content of starch (primary water content adjustment) | Step (2): amount of added fat | Emulsifying agent/fat (mass) | HLB of emulsifying agent | Fat | Step (3): secondary water content adjustment/ primary water content adjustment |
|---|---|---|---|---|---|---|
| Sample 1 | 21 mass % | 0.08 mass % | 4 | 3 | Perilla oil | 0.50 |
| Sample 2 | 26 mass % | 0.08 mass % | 4 | 3 | Perilla oil | 0.45 |
| Sample 3 | 35 mass % | 0.08 mass % | 4 | 3 | Perilla oil | 0.35 |
| Sample 4 | 44 mass % | 0.08 mass % | 4 | 3 | Perilla oil | 0.24 |
| Sample 5 | 49 mass % | 0.08 mass % | 4 | 3 | Perilla oil | 0.20 |
| Sample 6 | 35 mass % | 0.01 mass % | 1 | 3 | Safflower oil | 0.35 |
| Sample 7 | 35 mass % | 0.03 mass % | 1 | 3 | Safflower oil | 0.35 |
| Sample 8 | 35 mass % | 0.10 mass % | 1 | 3 | Safflower oil | 0.35 |
| Sample 9 | 35 mass % | 0.18 mass % | 1 | 3 | Safflower oil | 0.35 |
| Sample 10 | 35 mass % | 0.31 mass % | 1 | 3 | Safflower oil | 0.35 |
| Sample 11 | 35 mass % | 0.45 mass % | 1 | 3 | Safflower oil | 0.35 |
| Sample 12 | 35 mass % | 0.18 mass % | — | — | Safflower oil | 0.35 |
| Sample 13 | 35 mass % | 0.18 mass % | 0.3 | 3 | Safflower oil | 0.35 |
| Sample 14 | 35 mass % | 0.18 mass % | 6 | 3 | Safflower oil | 0.35 |
| Sample 15 | 35 mass % | 0.16 mass % | 1 | 1 | Linseed oil | 0.35 |
| Sample 16 | 35 mass % | 0.16 mass % | 1 | 3 | Linseed oil | 0.35 |
| Sample 17 | 35 mass % | 0.16 mass % | 1 | 9 | Linseed oil | 0.35 |
| Sample 18 | 35 mass % | 0.16 mass % | 1 | 11 | Linseed oil | 0.35 |
| Sample 19 | 26 mass % | 0.08 mass % | 4 | 3 | Perilla oil | 0.14 |
| Sample 20 | 44 mass % | 0.08 mass % | 4 | 3 | Perilla oil | 0.55 |

Tap water was added to 20 kg of a phosphoric acid-crosslinked tapioca starch (manufactured by Asia Modified Starch Co., Ltd.) so that they were stirred and mixed together by a mixer. Then, the water content of the starch was adjusted to 21, 26, 35, 44 and 49 mass %, respectively (this adjustment is referred to as "primary water content adjustment").

Glycerol fatty acid esters having an HLB of 3 or polyglycerol fatty acid esters having an HLB of 1, 9 or 11 were used as an emulsifying agent, and the emulsifying agent and a fat (perilla oil, safflower oil or linseed oil) were stirred and mixed together in a beaker so that the "emulsifying agent/fat (mass)" ratio was 0.3, 1, 4 or 6, thereby preparing 300 g of a mixture of the emulsifying agent and the fat. In addition, no emulsifying agent was used in Sample 12.

Next, the above-described mixtures of the emulsifying agent and the fat (fat alone in Sample 12) were each added to the above-described phosphoric acid-crosslinked tapioca subjected to the primary water content adjustment so that the amount of the fat to be added (excluding the mass of the emulsifying agent) was 0.01, 0.03, 0.08, 0.10, 0.16, 0.18, 0.31 or 0.45 mass % relative to the weight of dry matter of the starch, and they were stirred and mixed together by a mixer. In addition, the mixtures of the emulsifying agents and the fats were preliminarily heated to be dissolved, and then used.

Then, the water contents of the resultant starch mixtures were adjusted (this adjustment is referred to as "secondary water content adjustment"), and the starch mixtures were dried so that the "water content after the secondary water content adjustment/water content after the primary water content adjustment" ratio reached 0.14, 0.20, 0.24, 0.35, 0.45, 0.50 or 0.55.

These starch mixtures were each packaged in kraft paper bags for 20-kg packaging, then stored in a warehouse kept at 65° C. for 7 days, to obtain fat-processed starches.

Measurement of Slurry Viscosity

Samples were dispersed, in an amount of 108 g in terms of the weight of dry matter, in ice chilled water so that the total amount reached 300 g. Thereafter, a TVB 1 OM type viscometer (Toki Sangyo Co., Ltd.) was used to set the number of rotations of a rotor to 60 rpm. The slurry viscosity was measured as a value after 15-second rotation.

The results of evaluation of the slurry viscosity are shown in Table 2. The criteria for evaluation are as follows.

1: Very low (lower than 10 mPa·s)

2: Low (10 mPa·s or higher and lower than 100 mPa·s)

3: Normal (100 mPa·s or higher and lower than 500 mPa·s)

4: High (500 mPa·s or higher and lower than 1000 mPa·s)

5: Very high (1000 mPa·s or higher)

Evaluation of Pork Cutlet Using Pork Loin

Pork loin was used as an ingredient of a fry. Trimmed pork loin was sliced in a thickness of 10 mm, preliminarily frozen, and thawed only in the surface portion by warm air immediately before use. Batter was prepared by adding 1.2 parts of a polysaccharide thickener and 250 parts of ice chilled water to 100 parts of each of Samples 1 to 20 (in terms of the weight of dry matter) and stirring and mixing them together. The batter was attached to the pork loin in an amount of 28 mass % relative to the mass of the pork loin, and then the pork loin was coated with bread crumbs, and then frozen. In addition, the workabilities of Samples 1 to 20 were evaluated in the operation so far, and the criteria for evaluation are as follows.

1: Very bad; 2: Bad; 3: Normal; 4: Good; 5: Very good

After frozen storage, the frozen pork loin was fried by using refined soybean oil at 175° C. for 6 minutes to prepare pork cutlet. Pork cutlet was cut 3 minutes after frying, and the adhesion between the meat and the coating was visually evaluated after 120 minutes. The criteria for evaluation are as follows.

1: Completely separated; 2: Almost separated; 3: Half separated; 4: Almost adhered; 5: Completely adhered The comprehensive evaluation of Samples 1 to 20 is indicated in Table 2. The criteria for evaluation are as follows.

1: Bad; 2: Normal; 3: Preferable; 4: Very preferable; 5: Extremely preferable

TABLE 2

| Name of Sample | Slurry viscosity | Workability | Adhesion between meat and coating | Comprehensive evaluation |
|---|---|---|---|---|
| Sample 1 | 2 | 3 | 1 | 1 |
| Sample 2 | 3 | 4 | 3 | 3 |
| Sample 3 | 4 | 5 | 4 | 4 |
| Sample 4 | 3 | 4 | 3 | 3 |
| Sample 5 | 1 | 3 | 1 | 1 |
| Sample 6 | 1 | 5 | 1 | 1 |
| Sample 7 | 3 | 5 | 3 | 3 |
| Sample 8 | 4 | 5 | 4 | 4 |
| Sample 9 | 4 | 4 | 5 | 5 |
| Sample 10 | 5 | 3 | 4 | 3 |
| Sample 11 | 5 | 1 | 3 | 2 |
| Sample 12 | 2 | 1 | 2 | 1 |
| Sample 13 | 3 | 2 | 3 | 3 |
| Sample 14 | 3 | 5 | 2 | 3 |
| Sample 15 | 2 | 3 | 2 | 2 |
| Sample 16 | 5 | 4 | 5 | 5 |
| Sample 17 | 4 | 4 | 5 | 5 |
| Sample 18 | 2 | 4 | 2 | 2 |
| Sample 19 | 3 | 1 | 2 | 2 |
| Sample 20 | 3 | 3 | 1 | 1 |

As is evident from Table 2, the fat-processed starches of Samples 2, 3, 4, 7, 8, 9, 10, 13, 14, 16 and 17 were particularly excellent as coating materials for fries, and among others, Samples 3, 8, 9, 16 and 17 were remarkably excellent.

The invention claimed is:

1. A process for producing a fat-processed starch, which comprises:
    adding a fat, with which an emulsifying agent has been mixed, to a starch having a water content adjusted to 25 to 45 mass % of the starch,
        wherein the fat is added in an amount of 0.02 to 0.4 mass %, in terms of the weight of the fat except the emulsifying agent, relative to the weight of dry matter of the starch,
        wherein the emulsifying agent has an HLB of 2 to 10;
    mixing the fat and the starch;
    adjusting the water content of the mixture to 0.2 to 0.5 times the water content of the starch before the addition of the fat; and
    aging the starch having the adjusted water content at a temperature of 30° C. to 150° C., wherein the water content adjustment takes place before aging.

2. The process according to claim 1, wherein the amount of the emulsifying agent to be added to the fat is 0.5 to 5 time(s) the mass of the fat.

3. A fat-processed starch produced by the process according to claim 1.

4. A coating material for fries, comprising the fat-processed starch according to claim 3.

5. A fried food comprising the fat-processed starch according to claim 3.

6. A fried food comprising the coating material for fries according to claim 4.

* * * * *